United States Patent [19]

Braun et al.

[11] 3,766,792
[45] Oct. 23, 1973

[54] PLANER DRIVE SYSTEM

[75] Inventors: Gert Braun; Ernst Braun, both of Essen-Heisingen, Germany

[73] Assignee: Halbach & Braun, Wuppertal-Barmen, Germany

[22] Filed: Nov. 23, 1971

[21] Appl. No.: 201,430

[30] Foreign Application Priority Data
Nov. 24, 1970 Germany.................. P 20 57 605.0

[52] U.S. Cl................................. 74/243 H, 308/72
[51] Int. Cl. ...................... F16h 55/30, F16c 23/06
[58] Field of Search...................... 74/243 H, 245 C; 308/72

[56] References Cited
UNITED STATES PATENTS
3,266,331    8/1966    Burrows............................ 74/243 H

| 470,202 | 3/1892 | La Croix | 308/72 X |
| 2,101,685 | 12/1937 | Nisbet | 74/243 H |
| 3,456,518 | 7/1967 | Topouzian | 308/72 X |

FOREIGN PATENTS OR APPLICATIONS
107,213    4/1927    Austria................................ 308/72

Primary Examiner—Leonard H. Gerin
Attorney—Karl F. Ross

[57] ABSTRACT

A chain-driven planer blade, e.g. of a coal cutter or like subterranean excavator, is driven from a sprocket wheel mounted on a cantilevered stud of the drive housing. The stud extends into the hollow shaft of the sprocket wheel from one side while the shaft is driven by a transmission and motor from the other side to enable replacement of the transmission without removal of the sprocket wheel or opening of the chain.

8 Claims, 5 Drawing Figures

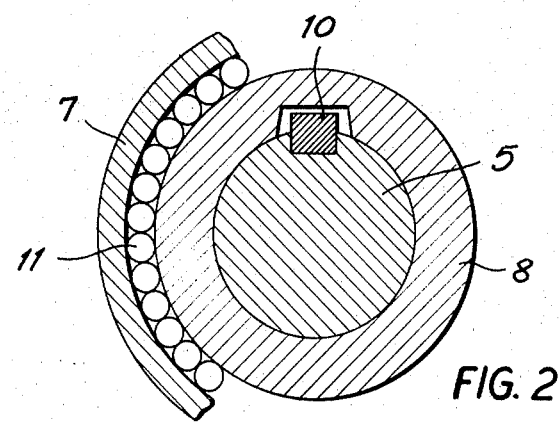
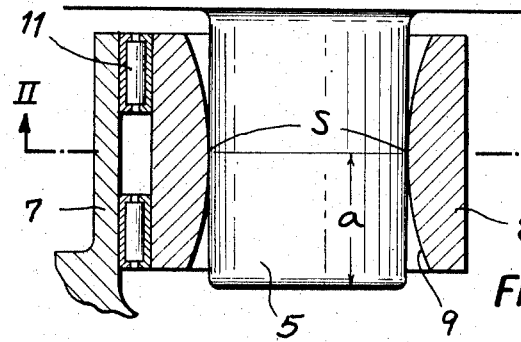
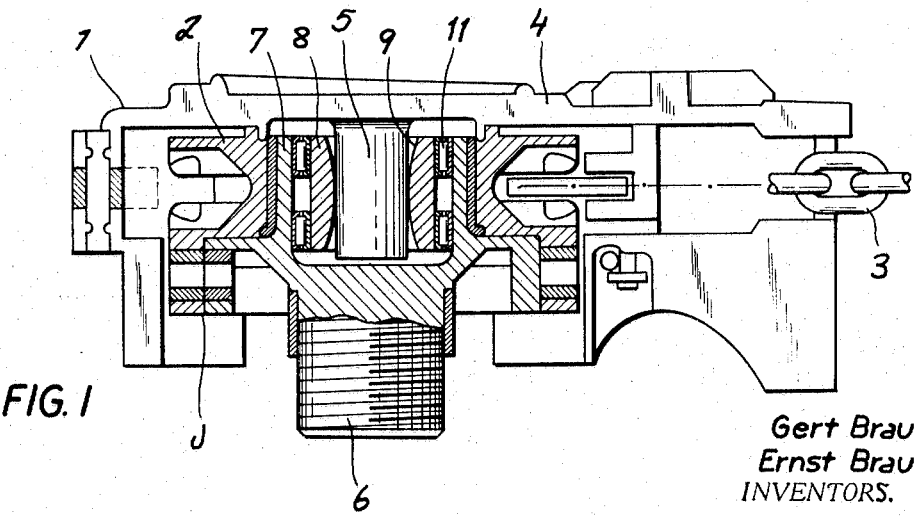

Gert Braun
Ernst Braun
INVENTORS.

BY

Karl J. Ross
Attorney 3,766,792

PLANER DRIVE SYSTEM

FIELD OF THE INVENTION

Our present invention relates to planer drive systems and, more particularly, to the chain-drive arrangement of a subterranean planer or cutter adapted to be used in mines or the like, for the cutting of coal or other materials from a seam or vein.

BACKGROUND OF THE INVENTION

Subterranean planers have been provided heretofore for many purposes and in many configurations, most employing chain drives for the cutting or planer blades. For example, it is a common practice to provide a vehicle which is displaceable in a mine or other tunnel and which carries a movable apron or flight conveyer along the sides and in the front of which are provided blade arrangements adapted to cut, chisel and scoop underground substances from the walls and/or the face of the tunnel and deposit them upon the conveyer for transport to trucks or the like for removal from the tunnel. Planer arrangements of this type are described in our commonly assigned U.S. Pats. No. 3,399,757, No. 3,419,126, No. 3,431,024 and No. 3,499,683 which disclose various blade configurations, arrangements for mounting them on the chain and other details of the apparatus.

In such structures, the chain generally passes over a pair of sprocket wheels having angularly spaced beds in which the chain links are received for positive driving of the chain. The chain may be used not only to operate the cutter blades but also to drive the conveyer and any other mechanical devices associated with the machine or to transmit power between a drive and a working chain. Frequently, it is necessary to remove the transmission or motor from the driving assembly and it has heretofore been necessary to open the chain so that the driving sprocket can be removed with the transmission, to slacken the chain by releasing the sprocket from the transmission, or to remove the sprocket with the transmission. These operations are time-consuming and difficult, and replacement of the sprocket, retaining of the chain or reconnection of the latter in a closed loop can be difficult and also time-consuming.

Removal of the transmission and/or the motor driving same is necessary whenever the usual maintenance steps must be taken and in the case of damage or breakdown. In the use of the apparatus in subterranean environments breakdown occurs more frequently and it may even be necessary to remove the transmission and/or its driving motor whenever a seizure develops in the drive system.

OBJECTS OF THE INVENTION

It is the principal object of the invention to provide an improved chain-drive assembly, especially for a subterranean planer, whereby the aforementioned disadvantages are avoided.

It is another object of the invention to provide an improved assembly of the character described with more efficient distribution and transfer of forces to the housing of the assembly than has been possible heretofore.

It is still another object of this invention to provide a sprocket arrangement for the purposes described wherein the transmission or driving assembly can be removed for repair or replacement without slackening the chain or removing same from the sprocket.

Yet another object of the invention resides in providing means for supporting the sprocket wheel of a chain drive such that shocks, sudden stresses and the like are not applied to any drive mechanism to which the sprocket wheel is coupled to the extent that they have been heretofore.

SUMMARY OF THE INVENTION

We have discovered that these objects can be obviated and a vast improvement in many of the operating characteristics of a chain-drive system can be obtained by providing a chaindrive housing having a cantilevered pin or stud which extends into a hollow shaft carrying the sprocket wheel from one end while the other end of this shaft is coupled with the drive or is provided with means for connecting the shaft to a transmission or other drive device. The invention resides in forming the stud member and the hollow-shaft member with a swiveltype linkage whereby the shaft is permitted some movement relative to the stud but in a direction perpendicular to the axis of the latter, forces with this component are taken up directly by the stud without play.

According to the invention, therefore, one of these members is provided with a generally cylindrical surface confronting the other member and bearing thereon with substantially line contact via a surface convex in the direction of this other member and defined by a generatrix corresponding to a circular or hyperbolic arc. The result is a generally spheroidal oscillating or swinging type junction between the shaft and the stud and, according to the invention, we provide the shaft with a sleeve angularly entrained by the stud and rotatable with respect to a socket formed by the shaft and receiving this sleeve. Bearing means may be provided between the sleeve and the shaft to enable rotation of the shaft while the sleeve is angularly fixed with respect to the stud but, as a result of the swinging, floating or oscillating junction defined by the generally arcuate surface can rock upon the stud. The shaft is thus able to rotate with respect to the stud and is adapted to rock relatively thereto while remaining in direct force-transmitting relationship therewith as regards any force-component in a direction perpendicular to the stud. The stud therefore takes up the transverse stresses resulting from tensioning of the chain as well as any shock or jolt transmitted thereby.

According to another feature of the invention, the curvilinearly convex surface is formed on the interior of the rockable sleeve and engages the cylindrical surface of the stud substantially at the midpoint of the length of the stud received in the sleeve, thereby reducing the force moment applied thereto to about half that which would be applicable if the forces were applied toward the end of the cantilevered pin for a given pin cross-section; the maximum stress which can be accommodated is thereby doubled.

Yet another feature of the present invention resides in the provision of a groove-spring coupling of the sleeve to the stud for anchoring the sleeve to the stud against angular displacement, however, enabling the sleeve to rock upon the stud. Preferably, the stud is provided with a groove or keyway receiving a spring key which fits into a keyway of the sleeve, one ot these keyways closely hugging the spring key while the other receives the key with slight play in the circumferential direction. Thus, while the sleeve and the stud are angularly fixed except for this play or slight relative angular movement, normal rocking action described above is likewise possible.

The bearing means between the sleeve and the hollow shaft may be of the roller or needle bearing type and we prefer to provide two circular arrays of the bearing needle at opposite axial ends of the sleeves, outwardly of the line-contact zone between the sleeve and the pin. This has been found to increase the life of the coupling and further distribute the stresses to which the device is subjected.

The assembly has the advantage that the transmission can be removed without releasing the chain and further that the support structure for the sprocket upon the housing takes up the stresses in a uniform manner. Shock and other momentary stresses also are absorbed by the housing structure and the sleeve acts as an aligning member to enable rapid assembly or disassembly of the device when recovered.

DESCRIPTION OF THE DRAWING

The above and other objects, features and advantages or the present invention will become more readily apparent from the following description, reference being made to the accompanying drawing in which:

FIG. 1 is a partial horizontal section through the assembly according to the present invention, the upper portion of the casing having been removed;

FIG. 2 is a cross-sectional view taken along the line II — II of FIGS. 1 and 3;

FIG. 3 is a detail view of a portion of FIG. 1 drawn to an enlarged scale;

SPECIFIC DESCRIPTION

Figure 4:
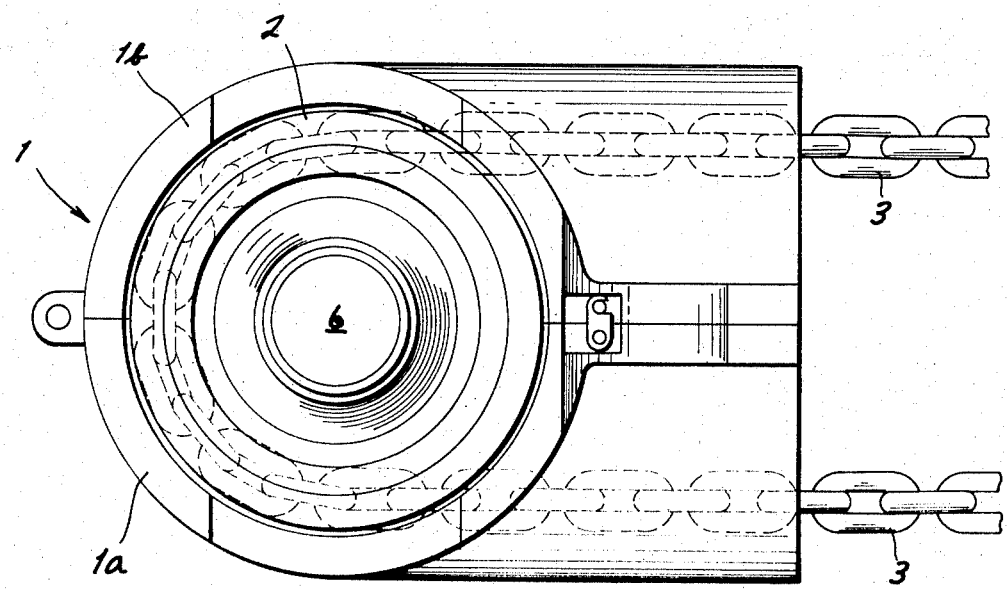
FIG. 4 is an elevational view, partly broken away, of the system.
Figure 5:
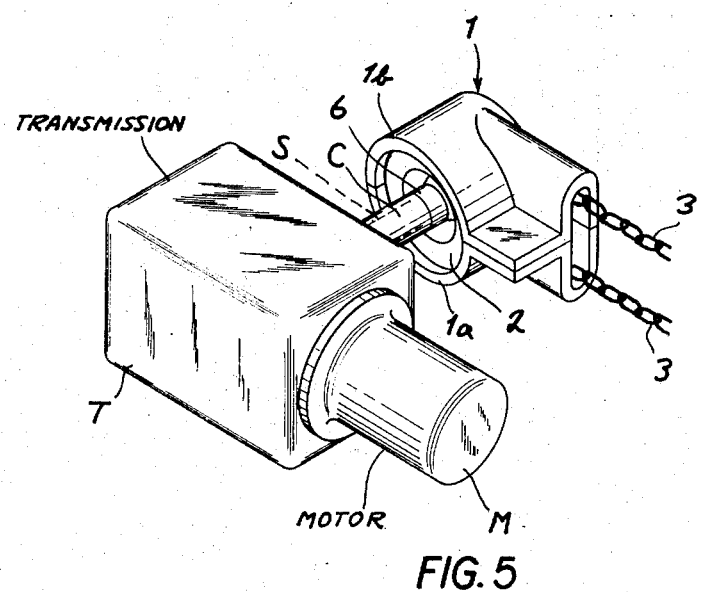
FIG. 5 shows the assembly as used in conjunction with a transmission or like device.

The chain-drive mechanism according to the invention is designed to be used in a planer, excavator or like apparatus as described and illustrated in the aforementioned patents. Generally, a motor M (FIG. 5) is connected to a step-down transmission T whose shaft S is removably connected to the shaft 6 of the present drive assembly by, for example, a coupling sleeve C.

From FIGS. 1 - 4, it will be apparent that the assembly comprises a chain-drive housing or casing 1 having upper and lower portions 1a, 1b which may be separated or dismounted, the upper housing portion being removed in FIG. 1. The housing receives a sprocket wheel 2 for the cutter chain 3 and has a closed face 4 provided with struts or ribs for structural reinforcement of this housing. The housing may be mounted upon the chassis of the machine in the usual manner. The housing 1 is provided with a cantilevered mounting stud 5 projecting in the direction of the sprocket wheel 2 which is carried by a shaft 6 on its hollow portion 7. The sprocket wheel 2 may be rotatably mounted on this portion of the shaft and can be connected thereto for rotation by the drive via a clutch or coupling arrangement generally shown at J in FIG. 1.

Between the cantilevered stud 5 and the hollow shaft section 7 of the drive shaft 6, there is provided a rocking sleeve 8 which, with play and via a convex inner surface 9, bears against the stud 5 and can compensate misalignment and nonuniform stresses by rolling along the stud 5. The inner surface 9 of rocking sleeve 8 has a convex curvature with a contact zone $s$ substantially at the middle of stud 5 so that the moment arm of forces applied to the stud is reduced by about half, as represented by distance $a$.

As is also apparent from the drawing, the surface 9 is defined by a hyperbolic or circular generatrix rotated about the axis of the sleeve. The latter is provided with a groove/spring-key arrangement 10 with limited angular displacement of the sleeve on the stud while enabling it to rock within the limits of the desired play. Roller or pin bearings 11 are provided between the sleeve and the shaft. In operation, the stud 5 takes up the normal tension stresses of the chain and any unusual shock applied by the chain to the sprocket wheel 2. To remove the transmission, it is merely necessary to disconnect the shaft 6 whereby the chain remains under tension. Furthermore, if it is desired to remove the sprocket wheel 2, the hollow shaft assembly 6, 7 may be withdrawn and replaced, the replacement being facilitated by the self-aligning action of sleeve 8.

We claim:

1. A chain-drive arrangement, especially for a planer or excavator chain, comprising:
   a housing formed with a cantilevered stud member;
   a hollow-shaft member receiving said stud member;
   a sprocket wheel mounted on said hollow-shaft member and adapted to be driven thereby;
   a sleeve between said members having an inwardly curved bulging surface engaging said stud member enabling rocking motion of said hollow-shaft member on said stud member while directly transmitting transverse force to the latter; and
   a roller bearing between said sleeve and said shaft member.

2. The arrangement defined in claim 1 wherein the last-mentioned means includes a generally cylindrical surface formed on one of said members and a curvilinearly convex bulge formed annularly on the other of said members and substantially in line contact with said cylindrical surface in the region of the midpoint of said stud member.

3. A chain-drive arrangement, especially for a planer or excavator chain, comprising a housing formed with a cantilevered stud member;
   a hollow-shaft member receiving said stud member;
   a sprocket wheel mounted on said hollow-shaft member and adapted to be driven thereby; and
   means between said members enabling rocking motion of said hollow-shaft member on said stud member while directly transmitting transverse force to the latter, the last-mentioned means including a generally cylindrical surface formed on one of said members and a curvilinearly convex bulge formed annularly on the other of said members and substantially in line contact with said cylindrical surface in the region of the midpoint of said stud member, said hollow-shaft member being formed with an internal sleeve provided with said bulge, a shaft receiving said sleeve, and bearing means between said shaft and said sleeve enabling rotation of said shaft relative to said sleeve, said sprocket wheel being mounted on said shaft.

4. The arrangement defined in claim 3, further comprising a groove and spring-key device interconnecting said stud member and said sleeve against substantial relative angular displacement while enabling said sleeve to rock on said stud.

5. The arrangement defined in claim 4 wherein said bearing means includes an array of roller bearings surrounding said sleeve.

6. The arrangement defined in claim 5 wherein said housing has a strut reinforced wall carrying said stud member.

7. The arrangement defined in claim 6 wherein said sleeve bears on said stud member in line contact in a median plane through said sprocket wheel perpendicular to the axis of said stud member.

8. The arrangement defined in claim 7, further comprising means for removably connecting a transmission to said shaft.

* * * * *